G. F. LYNN.
METHOD OF MAKING HYDROCARBON MOTORS.
APPLICATION FILED JULY 19, 1917. RENEWED APR. 22, 1920.

1,386,007.

Patented Aug. 2, 1921.
2 SHEETS—SHEET 1.

INVENTOR
George F. Lynn,
BY
ATTORNEY

G. F. LYNN.
METHOD OF MAKING HYDROCARBON MOTORS.
APPLICATION FILED JULY 19, 1917. RENEWED APR. 22, 1920.

1,386,007.

Patented Aug. 2, 1921.
2 SHEETS—SHEET 2.

INVENTOR
George F. Lynn,
BY
ATTORNEY

UNITED STATES PATENT OFFICE.

GEORGE F. LYNN, OF DETROIT, MICHIGAN, ASSIGNOR TO PACKARD MOTOR CAR COMPANY, OF DETROIT, MICHIGAN, A CORPORATION OF MICHIGAN.

METHOD OF MAKING HYDROCARBON-MOTORS.

1,386,007.  Specification of Letters Patent.  Patented Aug. 2, 1921.

Application filed July 19, 1917, Serial No. 181,527. Renewed April 22, 1920. Serial No. 375,897.

*To all whom it may concern:*

Be it known that I, GEORGE F. LYNN, a citizen of the United States, and resident of Detroit, Wayne county, State of Michigan, have invented certain new and useful Improvements in Methods of Making Hydrocarbon-Motors, of which the following is a specification.

This invention relates to hydrocarbon motors and particularly to the formation of cylinders therefor. The invention also relates to a method of welding sheet metal jackets to cylinders.

One of the objects of the invention is to form a motor cylinder of particularly light construction while at the same time providing strength and rigidity and ability to withstand high heat.

Another object of the invention is to provide a novel method of welding a sheet metal jacket to a cylinder such as a motor cylinder.

Other objects of the invention will appear from the following description taken in connection with the drawings which form a part of this specification, and in which:—

Figure 1:
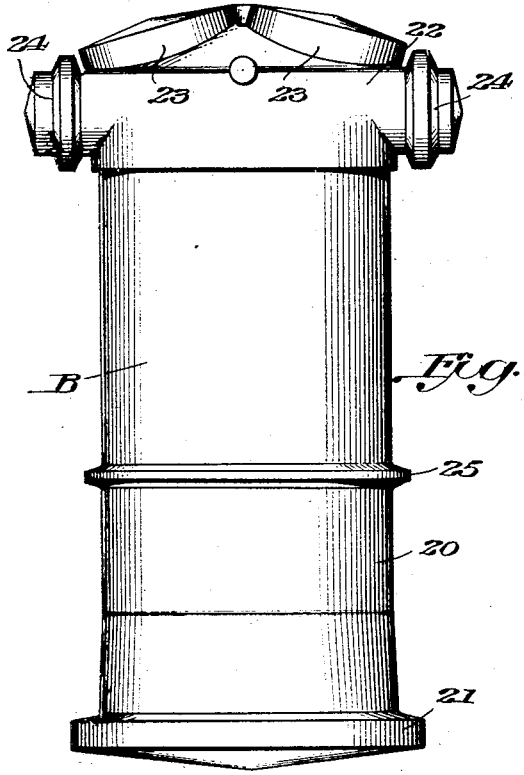
Figure 1 is an elevation of a drop forged blank from which the cylinder proper of a motor cylinder may be machined.

For the purpose of obtaining a very strong cylinder, the cylinder proper of this invention is preferably formed from a steel drop forging such as illustrated in Fig. 1. This cylinder blank is indicated at B and it has a main body portion 20 at the lower end of which is roughly formed a flange 21 and at the upper end of which is a head 22 having suitable bosses 23 and 24 to which other parts of the cylinder may be welded or otherwise secured in making a finished motor cylinder. At a suitable point along the body of the cylinder a radial flange 25 is roughly formed.

Figure 2:
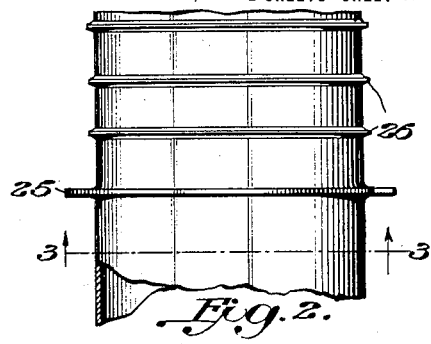
Fig. 2 is an elevation of a portion of the cylinder blank shown in Fig. 1 after it has been machined.
Figure 3:
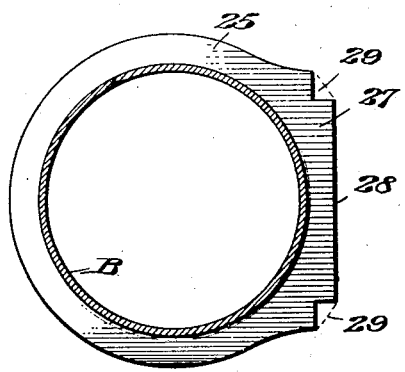
Fig. 3 is a section on the line 3—3 of Fig. 2.
Figure 4:
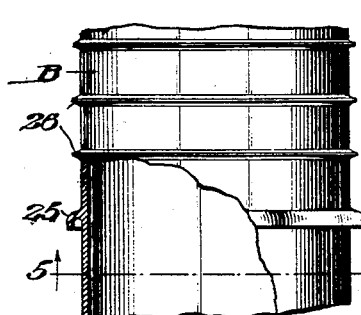
Fig. 4 is a view similar to Fig. 2 showing the machined flange on the cylinder bent over or downwardly.
Figures 5, 11:
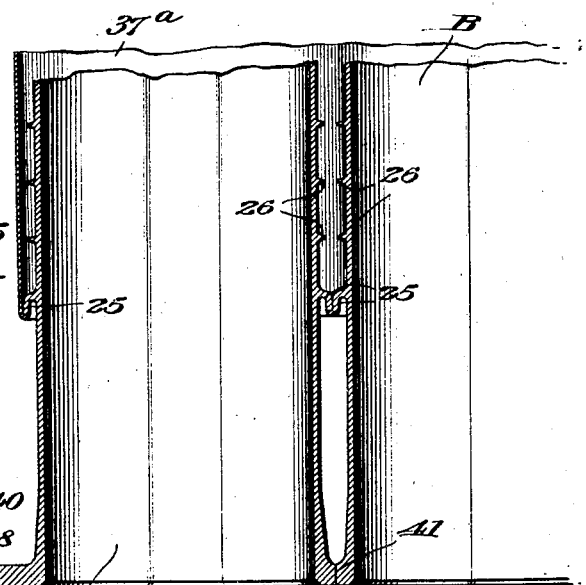
Fig. 5 is a section on the line 5—5 of Fig. 4.
Fig. 11 is a vertical section of two cylinders joined together with a single jacket around them.

It will be understood that the blank shown in Fig. 1 is bored out and the exterior is machined so that a comparatively thin cylinder wall is obtained throughout its length. A portion of the machined cylinder is shown in Fig. 2. The flange 25 thereof is of substantially uniform thickness instead of being tapered as was necessary in the forging. Strengthening ribs 26 are left on the cylinder. If the cylinder is to be used with a separate water jacket the flange 25 will be the same width throughout, but in Figs. 2 and 3 the flange is extended somewhat on one side of the cylinder as shown particularly at 27 in Fig. 3. This extended part gives an irregular shape to the flange, part of its outer edge being straight at 28 and notches 29 are cut in it to assist in bending the flange downwardly as hereinafter described. The thickness of the flange 25 depends largely upon the thickness of the sheet metal water jacket which is to surround the cylinder and to be connected to the flange. It is desirable that the outer part of the flange at least should be substantially the same thickness as the said jacket. The outer part of the flange 25 shown in Figs. 2 and 3 is now bent over or downwardly as shown in Figs. 4 and 5. If the flange is to be circular this shape may be obtained by the original machining operation but with the irregular shape of flange shown in Fig. 5, used to permit two cylinders to be brought closely together, the flange is preferably formed radially as shown in Fig. 2 and then bent over by the use of suitable tools.

Figure 7:
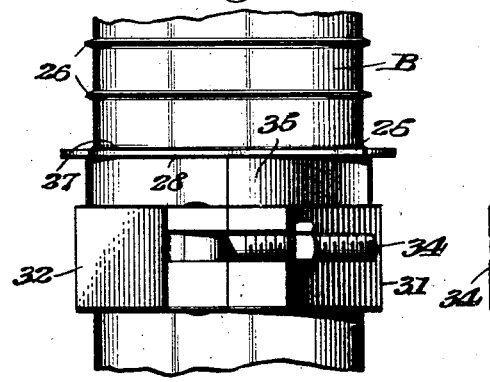
Fig. 7 shows the anvil in position on the cylinder ready to have the flange bent over it.
Figure 8:
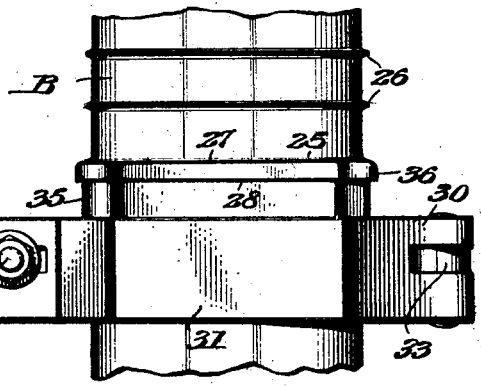
Fig. 8 is similar to Fig. 7 except that the flange has been bent over the anvil.
Figure 6:
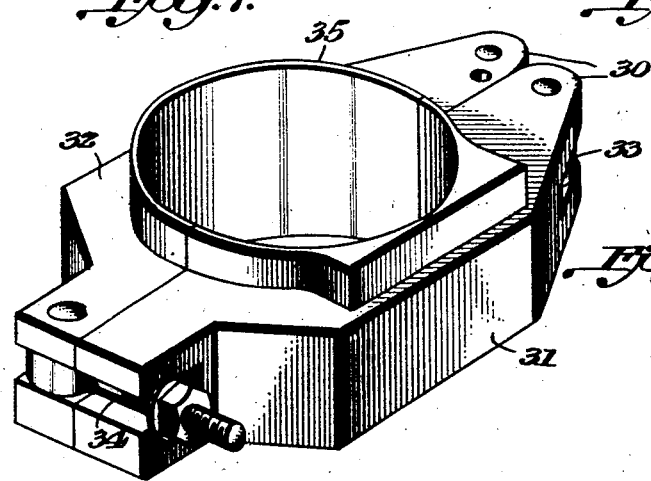
Fig. 6 is a perspective view of a two part anvil or tool used in bending over the flange on the cylinder.

Fig. 6 illustrates in perspective a two part tool 30 which may be used for bending over the flange. This tool comprises blocks 31 and 32 pivotally connected together by a link 33 and detachably connected at their other ends by a bolt 34. The upper portions of the blocks form an anvil 35 of the desired shape of the down-turned flange and these blocks are clamped about the cylinder directly beneath the flange 25 as shown in Fig. 7. In Fig. 8 the flange has been hammered or otherwise bent down over the anvil 35 and the bent portion 36 of the flange forms a skirt to which the sheet metal water jacket above referred to may be secured. The tool 31 may be readily removed from the cylinder after the bending over operation.

Figure 9:
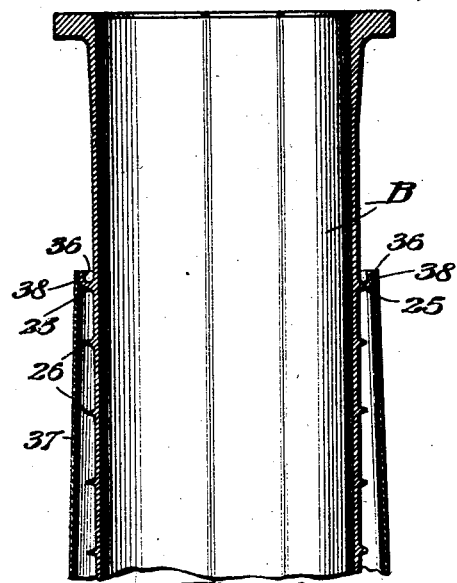
Fig. 9 is a vertical section of an inverted cylinder with its jacket thereon ready to be welded.
Figure 10:
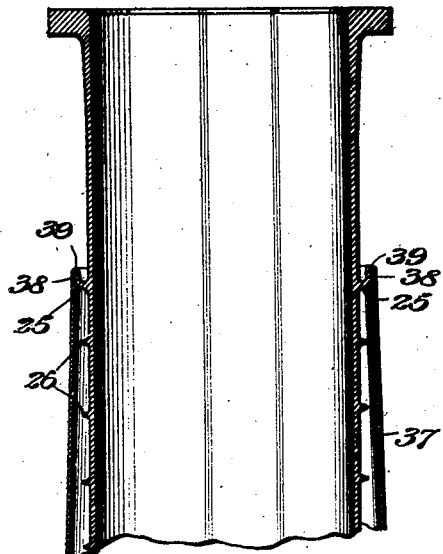
Fig. 10 is similar to Fig. 9 except that the welding operation has been performed for joining the jacket to the cylinder.

In Fig. 9 the cylinder B is shown inverted and a water jacket 37 is shown surrounding the cylinder and the flange 25. The water jacket is in contact with the bent over part 36 of the flange 25 and its extreme end 38 is in juxtaposition to the end of the skirt 36. These two pieces of metal are of substantially the same thickness and they are advantageously positioned for applying a welding heat without too greatly heating the body of the cylinder. In Fig. 10 the welding has been applied at 39 to the ends of the jacket and skirt and those two parts have been welded together.

In Fig. 11, two cylinders B are shown and they are arranged so closely together that the straight part 40 of the skirt 36 of one cylinder is in contact with the straight part of the shirt of the adjacent cylinder. These straight parts of the skirts may be heated and thereby welded together and a single jacket 37ª is then placed around both of the cylinders and welded to the curved parts of the skirts in the manner illustrated in Figs. 9 and 10. The cylinders may also be welded together at their bases where their flanges come together as shown at 41 in Fig. 11.

But a single form of the invention is shown and described herein. However it will be understood that other forms and modifications may be made without departing from the spirit or scope of the claims.

Having thus described my invention, what I claim and desire to secure by Letters Patent is:—

1. A method of making a cylinder block consisting in forming two cylinders each with radial flanges having bent over outer portions forming skirts, welding parts of the skirts of the cylinders together, placing a water jacket around the two cylinders in contact with the parts of the skirts that are not so welded together, and welding said jacket to said skirts.

2. A method of making a cylinder block consisting in forming two cylinders each with radial flanges having bent over outer portions forming skirts, welding parts of the skirts of the cylinders together, placing a water jacket around the two cylinders in contact with the parts of the skirts that are not so welded together, and welding the ends of said jackets to the ends of said skirts.

3. A method of welding a sheet metal jacket to a cylinder consisting in forming the cylinder with an external radial flange, bending the outer part of the flange over, placing the jacket over the flange with its end in juxtaposition to the bent over part of the flange, and heating said jacket end and flange to cause them to flow together.

4. A method of welding a sheet metal jacket to a cylinder consisting in forming the cylinder with an external radial flange, bending the outer part of the flange over parallel with the cylinder wall, placing the jacket over the flange with its end in juxtaposition to the bent over part of the flange, and heating said jacket end and flange to cause them to flow together.

5. A method of welding a sheet metal jacket to a steel cylinder consisting in forming the cylinder with an integral external radial flange, bending the outer part of the flange over, placing the jacket over the flange so that it surrounds the cylinder and flange and with its end coinciding with the end of the flange, and heating said ends to cause them to flow together.

6. A method of welding a sheet metal jacket to a steel cylinder consisting in forming the cylinder with an integral steel flange having a down-turned outer part, placing the jacket around the cylinder with its end in juxtaposition to the flange, and heating the jacket end and the flange to cause them to flow together.

7. A method of making a jacketed motor cylinder consisting in forming a radial flange on the cylinder proper, bending the outer part of said flange over an anvil, placing the jacket around the cylinder and flange with its end in juxtaposition to the bent over part of the flange, and heating the jacket and flange to cause them to flow together.

8. A method of making a jacketed motor cylinder consisting in forming an irregularly shaped radial flange on the cylinder proper, bending the outer part of said flange over a shaped anvil, placing metal parts of substantially the thickness of said bent over part in contact with said bent over part of the flange, and heating the bent over part of said flange and the metal in contact therewith to cause them to flow together.

9. A method of making a jacketed motor cylinder consisting in forming a notched irregular radial flange on the cylinder proper, bending the outer part of said flange over a shaped anvil, placing metal parts of substantially the thickness of said bent over part in contact with said bent over part of the flange, and heating the bent over part of said flange and the metal in contact therewith to cause them to flow together.

In testimony whereof I affix my signature.

GEORGE F. LYNN.